Oct. 21, 1952 — W. DE BACK ET AL — 2,614,595
FRUIT CORING MACHINE
Filed Sept. 9, 1949 — 4 Sheets-Sheet 1
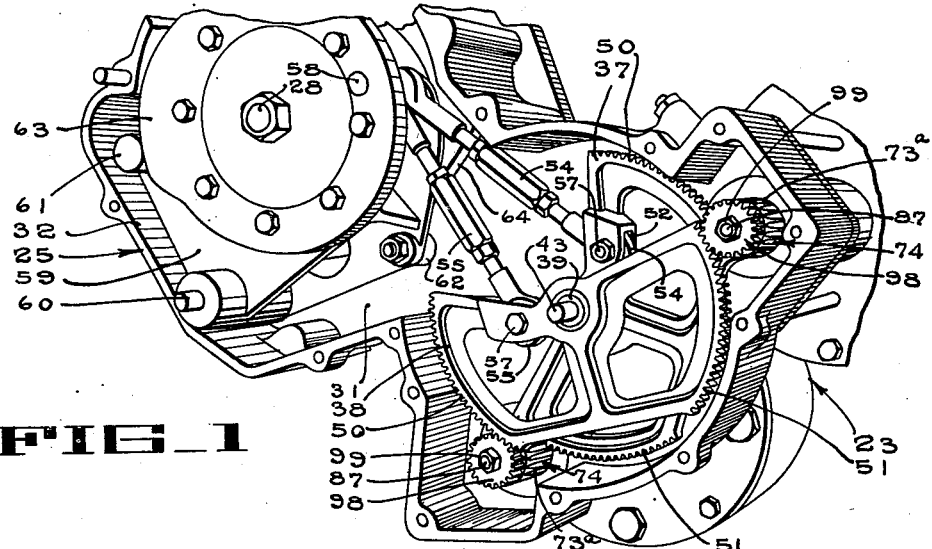
FIG_1
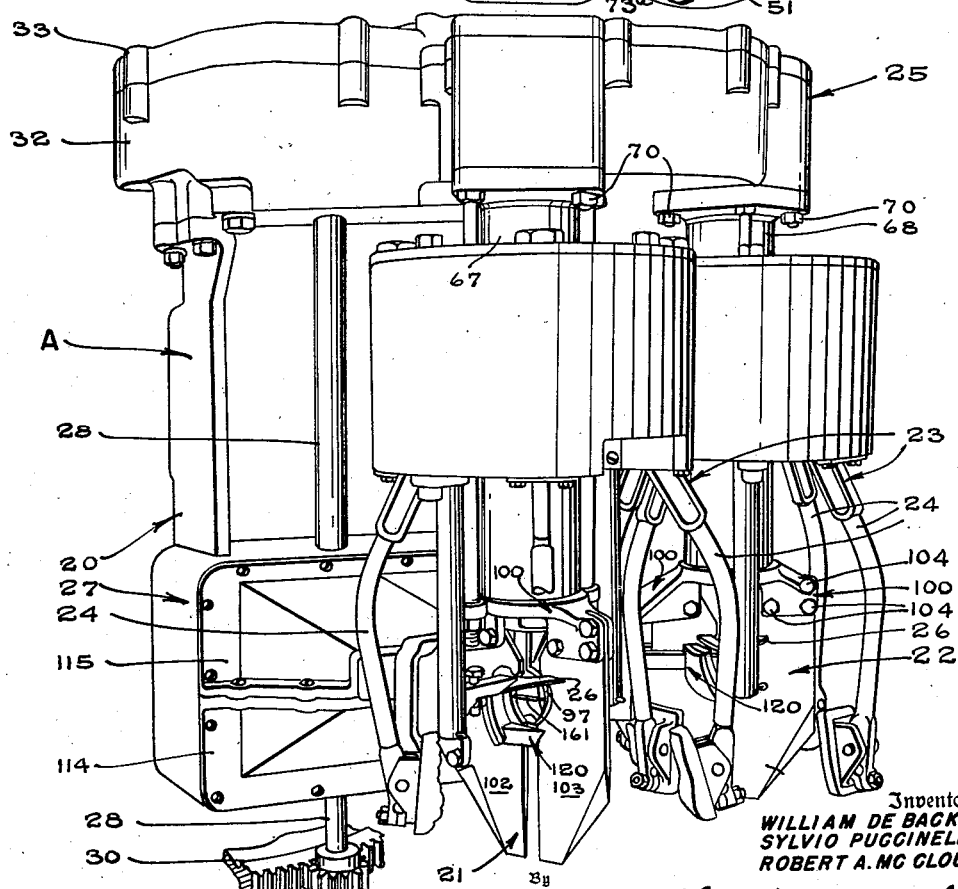
FIG_2
Inventors
WILLIAM DE BACK
SYLVIO PUCCINELLI
ROBERT A. MC CLOUD
Hans G. Hoffmeister
Attorney Oct. 21, 1952 W. DE BACK ET AL 2,614,595
FRUIT CORING MACHINE
Filed Sept. 9, 1949 4 Sheets-Sheet 2
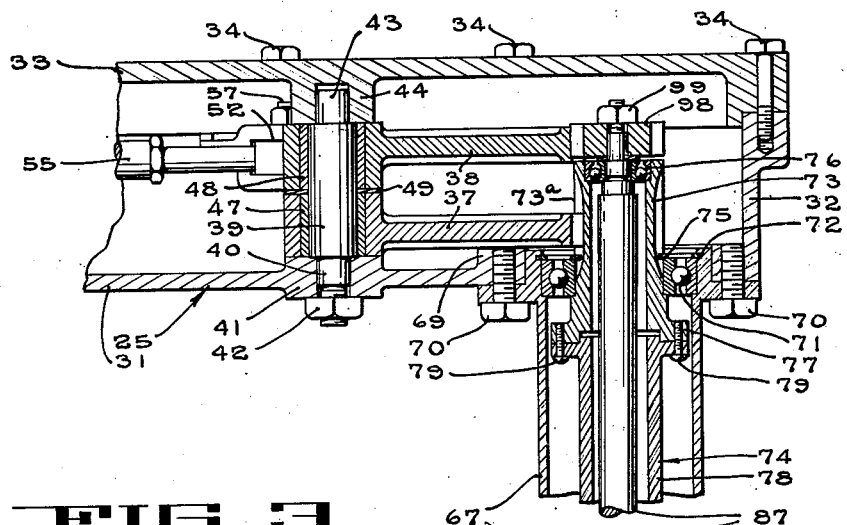
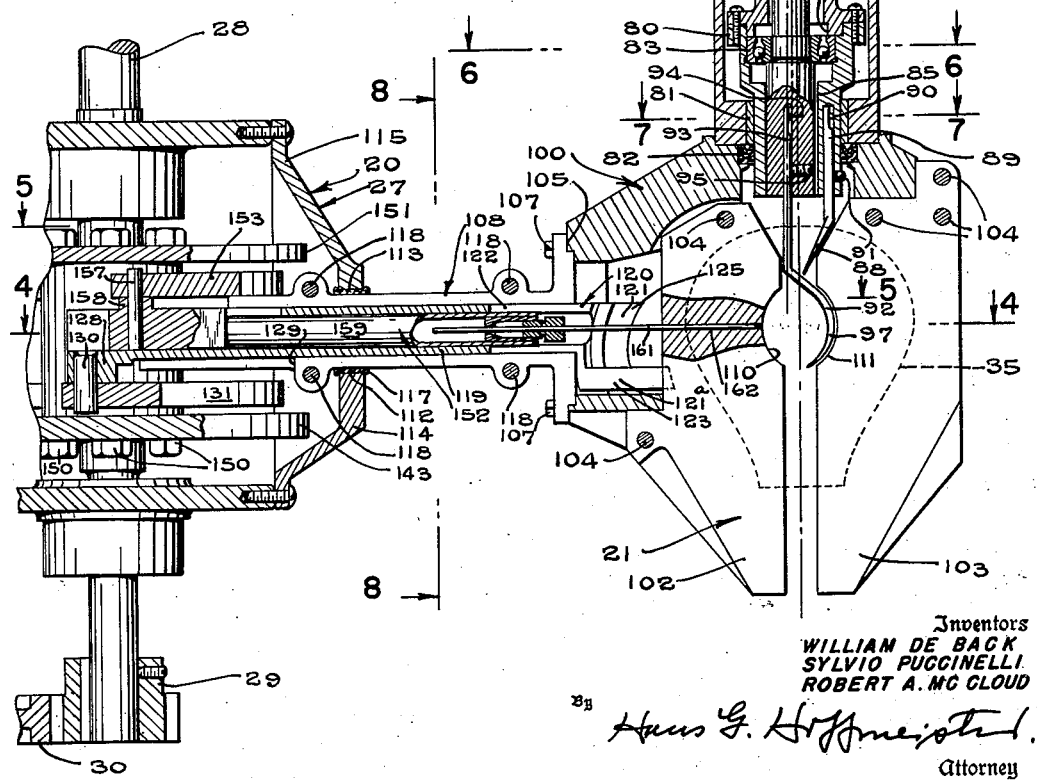
FIG_3
Inventors
WILLIAM DE BACK
SYLVIO PUCCINELLI
ROBERT A. MC CLOUD
By Hans G. Hoffmeister
Attorney

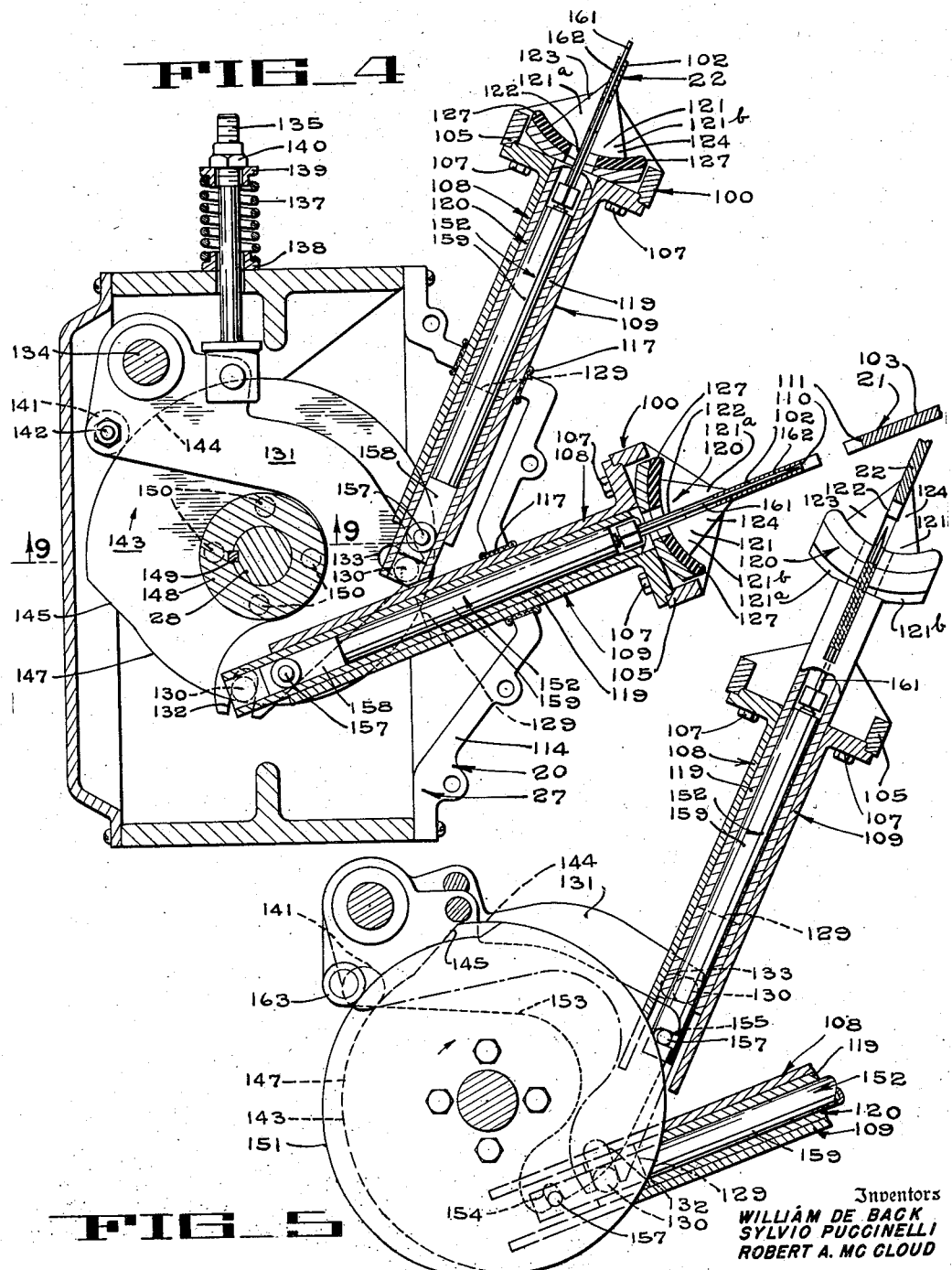

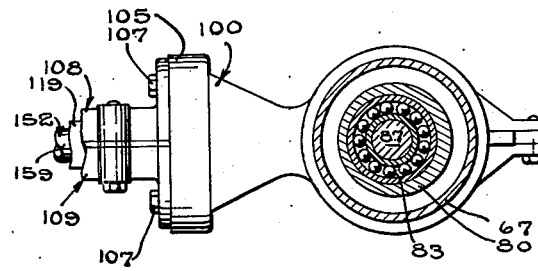
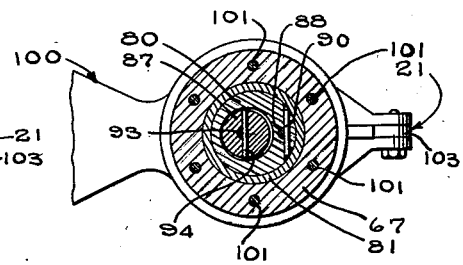

Patented Oct. 21, 1952

2,614,595

UNITED STATES PATENT OFFICE 2,614,595

FRUIT CORING MACHINE

William de Back and Sylvio Puccinelli, San Jose, and Robert A. McCloud, San Lorenzo, Calif., assignors to Food Machinery and Chemical Corporation, San Jose, Calif., a corporation of Delaware Application September 9, 1949, Serial No. 114,848

22 Claims. (Cl. 146—33)

1

The present invention appertains to a fruit preparation machine, and relates more particularly to a coring and splitting head for a pear preparation machine, and the method of operation thereof.

An object of the invention is to make an improved coring and splitting assembly for a pear preparation machine.

Another object is to sever the seed cells from the flesh of a pear, with a minimum loss of edible flesh, the pear being halved, and the halves thereof being supported on opposite sides of a splitting blade.

Another object is to peel the calyx depression of a pear which has been halved, and the two halves of which are supported on opposite sides of a splitting blade, and to sever the seed cells from the flesh of such a pear by relatively eccentric rotating knives.

Another object is to rotate a calyx trimming knife around a stationary axis, and to swing the curved blade of a seed cell severing knife about the shank thereof, while moving the shank along a planiform path by means of a pair of substantially concentric drive pinions.

Another object is to operate simultaneously two pairs of coring devices located at laterally separated stations, each coring device comprising a first knife mounted to rotate about a stationary axis and a second knife having a curved blade portion mounted to swing about a shank moving laterally in a straight line, the straight line movement of the shank being accomplished by reverse rotation in opposite directions of two axially divergent knife support shafts.

Another object is to retain a core severed from a halved fruit while the two halves of the fruit are separated laterally and ejected away from the retained core.

Another object is to divide the flesh of a fruit into halves, sever the core from the flesh of the fruit, project a retaining spike into an undivided core element of the fruit, eject the fruit halves away from the core, and thereafter release the core.

Another object is to separate the two halves of a fruit supported on opposite sides of a splitting blade by inserting a wedge between each fruit half and the splitting blade, and then to subject the fruit halves to an ejecting impact along the plane of the splitting blade.

Another object is to make an improved ejector for the halves of a fruit which has been divided along a median plane by a splitting knife.

Another object is to separate and eject fruit halves located on opposite sides of a splitting blade.

These and other objects of the invention will be brought out more clearly in the following description and the accompanying drawings, wherein:

Fig. 1 is a perspective view looking down into an upper housing containing driving mechanism for the coring and calyx trimming mechanism of the present invention, the cover of the housing being removed and the parts being shown in their normal unoperated positions.

Fig. 2 is a perspective view of the coring and splitting head comprising the present invention as it would appear mounted on a pear preparation machine, the parts being shown in fruit ejecting position.

Fig. 3 is a vertical section of the mechanism of Fig. 2 taken substantially in the plane of the left hand splitting blade of Fig. 2, the parts being shown in normal position.

Fig. 4 is a transverse section taken along the line 4—4 of Fig. 3.

Fig. 5 is a fragmentary section along the line 5—5 of Fig. 3, the housing and other parts being omitted, and showing one ejector and core retaining spike and the actuating cams and levers therefor as they would appear when actuated.

Fig. 6 is a transverse horizontal section taken along the line 6—6 of Fig. 3.

Fig. 7 is a similar fragmentary section taken along the line 7—7 of Fig. 3.

Fig. 8 is a fragmentary section taken along the line 8—8 of Fig. 3 and showing a splitting blade mounting assembly.

Fig. 9 is a fragmentary section along the line 9—9 of Fig. 4 with a housing cover plate and its supported ejector mechanisms removed.

Figs. 10, 11, 12 are diagrammatic views in the nature of sections along the line 7—7 of Fig. 3.

Referring to the drawings, the coring, splitting and ejecting head A of the present invention is adapted to be pivoted for oscillation about the vertical central axis, not shown, of a fruit preparation machine of the type illustrated in the co-pending application of William deBack and Sylvio Puccinelli, filed September 6, 1949, Serial No. 114,168. Since the manner of mounting and driving the present splitting and coring head on a fruit preparation machine will be obvious to one conversant with the design of such machinery having an understanding of the present invention as set forth herein, a description of the machine upon which the device is intended to be mounted is omitted from the present description.

The pear preparation machine with which the illustrated form of the present mechanism is intended to be incorporated is known as a vertical type machine wherein the pears are impaled along their stem-blossom axes on stemming tubes which are mounted at equal intervals around the marginal edge of a continuously rotating stemming tube turret, not shown.

While specifically illustrated for use in a vertical type machine, it will of course be obvious that the present mechanism can be readily adapted for use on other types of fruit preparation machines, such for example as that shown in Thompson Patent 2,139,704, or others wherein the fruit is split into halves, cored, and ejected.

The coring and splitting head A of the present invention comprises a frame 20 (Figs. 2, 3 and 4) which is pivoted in a usual manner for oscillation about the central vertical axis of the stemming tube turret, not shown, of the machine with which it is associated. The stemming tube turret rotates continuously to carry the usual stemming tubes, upright, in single file, beneath a pair of splitting blades 21 and 22 mounted on the frame 20.

The coring and splitting head A is oscillated back and forth in the manner set forth in the previously mentioned co-pending application, Serial No. 114,168, in timed relation to the rotation of the stemming tube turret, so as to be swung through one portion of its oscillation with the splitting blades in transferring register with a pair of stemming tubes, and then to be swung back in the opposite rotative direction to register with the next succeeding pair of stemming tubes.

While the splitting blades are moving in register with a pair of stemming tubes a gripping mechanism 23 of a well known type, having gripping arms 24 thereon, and which is illustrated and described in the Thompson Patent 2,139,704 mentioned previously herein, moves downwardly, grips the pears on the axially aligned stemming tubes, and moves the pears upwardly to impaled, split condition on the splitting blades. A pair of usual butt stop members 26 limit the height to which the pears can be raised on the blades to insure positioning the pears on the blades substantially as indicated by the dotted line 35 in Fig. 3.

An upper housing 25 is provided on the frame 20 to house actuating mechanism for the coring and calyx trimming knives, and a lower housing 27 also is provided on the frame 20 to house actuating mechanism for a pair of core retaining spikes and ejectors, to be described later herein, one of each of which is associated with each of the splitting blades 21 and 22.

A vertical drive shaft 28 (Figs. 1, 2 and 3) is journaled in the lower housing 27 (Fig. 3), and also extends into and is journaled in the upper housing 25 (Figs. 1 and 2). The lower end of the drive shaft 28 projects downwardly below the lower housing 27, and a pinion 29, keyed to the lower end thereof, is in driven engagement (Fig. 2) with an externally toothed ring gear 30 mounted to rotate continuously with the stemming tube turret.

As mentioned previously herein, the coring and splitting head of the present invention oscillates back and forth, moving partly in congruent relation with the stemming tube turret, and partly in a direction reversely thereto. While the coring and splitting head A is moving in congruent relation with the stemming tube turret, the pinion 29 will swing with the ring gear 30 on the stemming tube turret, and there will therefore be no relative movement between the pinion and the ring gear, which would cause a rotation of the pinion. However, when the coring and splitting head A swings back in the direction counter to the continuous rotative movement of the stemming tube turret, and in fact at any time in its cycle except when it is moving congruently with the stemming tube turret, there will be a relative movement between the pinion 29 on the coring and splitting head, and the ring gear 30 on the stemming tube turret, which will cause a rotation of the pinion 29. The ratio between the ring gear 30 and the pinion 29 is such as to cause one complete 360° revolution of the vertical drive shaft 28 on each complete oscillating cycle of the coring and splitting head.

Referring now to the coring and calyx trimming mechanism of the present invention, the upper housing 25 (Figs. 1, 2 and 3) is pan shaped, with a bottom plate 31 and integrally cast side walls 32. A cover plate 33 is fitted onto the upper edge of the side walls 32 to have a grease tight seal therewith, and is secured to the upper edge of the side wall by screws 34.

A pair of double segmental gears 37 and 38 are pivotally mounted on a post 39 which has a reduced threaded lower portion 40 fitted into a hole in a boss 41 on the bottom 31 of the upper housing 25, and is secured in position therein by a nut 42. This gear mounting post 39 also has a reduced upper portion 43 adapted to be inserted in a socket drilled in a boss 44 in the cover plate 33. Bearing bushings 47 and 48 are inserted in the hubs of the segmental gears 37 and 38, respectively, and a friction reducing washer 49 is interposed between the hubs.

A pair of concentric, arcuate, toothed portions 50 and 51 (Fig. 1) are provided peripherally on each of the segmental gears 37 and 38. A recess 52 is formed in an arm of each of the gears 37 and 38, these recesses being adapted to receive the eyes on the outer ends of a pair of adjustable actuating links 54 and 55 therein. The eyes on the outer ends of the links 54 and 55 are pivotally connected to their respective segmental gears by pivot pins 57. The segmental gears 37 and 38 are similar to each other, but are pivoted on the post 39 with the faces thereof reversed from each other (Fig. 1), so that the outer ends of the two connecting links are disposed on opposite sides of the pivot post 39 from each other.

The inner ends of the adjustable links 54 and 55 (Figs. 1 and 3) are pivotally connected to a pivot pin 58 on a cam actuated lever arm 59. The lever arm 59 is mounted for free pivotal movement on a pivot post 60 mounted at one side of the upper housing 25 in a manner similar to that described for the gear mounting post 39. The lever arm 59 has a cam follower roller 61 (Fig. 1) extending upwardly from its upper side, and a similar cam follower roller 62 extending downwardly from its under side diametrically opposite from the upper roller 61. The upper roller 61 is in operative engagement with the periphery of an upper cam 63, which is keyed to the upper end of the vertical drive shaft 28, while the lower roller 62 is in operative engagement with the opposite side of a complementary cam 64, also keyed to the drive shaft. The lower cam 64 and roller 62 hold the upper roller 61 in close operative engagement with the upper cam 63 throughout its complete cycle of rotation.

Since the vertical drive shaft 28 is rotated one complete revolution upon each cycle of operation of the coring and splitting head, as mentioned previously herein, the cams 63 and 64 likewise will be rotated through one complete revolution on each such operation. The cams 63 and 64 are shaped so that at the initiation of each rotative cycle of the drive shaft 28, the cams 63 and 64 first will swing the lever arm 59 in a clockwise direction to thrust the links 54 and 55 outwardly to swing the double segmental gears 37 and 38 in opposite rotative directions, then will cause the lever arm 59 to dwell in such actuated position, and then will return the lever arm and its connected parts in the opposite direction to their normal positions shown in Fig. 1.

A pair of tubular vertical shaft housings 67 and 68 (Figs. 2, 3, 6, 7 and 8) are fitted into holes bored in bosses 69 (Fig. 3) on the bottom of the upper housing 25. These tubular housings are secured in their respective openings by bolts 70.

The outer race of a ball bearing 71 is seated in an annular recess around the upper end of the bore of each tubular shaft housing and is retained in position therein by a snap ring 72 inserted in a groove in the wall of the tube above the outer bearing race. The inner race of the ball bearing 71 is seated on a shoulder flange formed around the lower portion of a tubular calyx knife shaft 74. The inner race of the bearing 71 is retained in position on the shouldered offset by a second snap ring 75.

A self-aligning ball bearing 76 of a usual type has its outer race inserted, with a press fit, into recesses provided therefor concentrically in the upper end of the toothed upper shaft portion 73.

The upper portion 73 of the calyx knife shaft has a plurality of teeth 73a formed around it in the nature of a pinion, and also has a radial flange 77 around its lower end. The flange 77 is fitted concentrically onto the radially flanged upper end of a tubular, intermediate, calyx knife shaft portion 78, and is secured thereto by screws 79. The lower end of the intermediate calyx knift shaft portion 78 also is flanged, similarly to its upper end, and is fitted concentrically onto the upper end of a lower shaft portion 80 in a manner generally similar to the connection between the toothed upper shaft portion 73 and the intermediate shaft portion 78. The lower shaft portion 80 is journaled in a bearing bushing 81 inserted concentrically in the lower end of the tubular housing 67. A usual type of lubricant sealing ring 82 is provided below the bushing 81 to seal the joint between the calyx knife shaft 74 and the tubular housing 67.

The outer race of a usual type of self-aligning ball bearing 83 is mounted in an eccentric recess in the upper end of the lower calyx knife shaft portion 80. A corresponding eccentric recess 84 is provided in the lower end of the intermediate shaft portion so that the marginal edge portion surrounding the recess will overlie and retain the outer race of the bearing 83 in its seat.

The lower tubular calyx knife shaft portion 80 has a bore 85 eccentrically through its lower end. An inner seed cell severing knife shaft 87 (Fig. 3) has the inner races of the upper and lower self-aligning ball bearings 76 and 83 fitted thereon for axial rotation in these bearings, and the lower end of the inner seed cell knife shaft 87 passes freely through the eccentric bore 85 in the lower shaft portion 80. The axis 74a (Fig. 3) of the tubular shaft 74, intersects the axis 87a of the inner shaft 87 substantially at the center of the upper self-aligning ball bearing 76.

A calyx knife 88 for peeling the calyx depressions of the pears has its shank 89 inserted upwardly in a hole drilled endwise in the thickest wall portion of the lower end portion 80 of the tubular shaft 74, and thus is eccentric to the axis of the tubular shaft 74 in a direction diametrically opposite to the eccentricity of the bore 85 therein, and to the eccentricity of the lower end of the inner shaft 87. The upper end of the shank of the calyx knife has a flat face ground thereon, and is held against rotative displacement by a locating pin 90. A set screw 91, screwed into a threaded hole in the lower tubular shaft portion 80, engages the shank 89 of the calyx trimming knife and secures it in adjusted position, substantially parallel, and closely adjacent, to the sloping upper edge of the splitting blade to be described later herein.

A seed cell severing knife 92 has its shank 93 inserted in a hole drilled in the lower end of the inner shaft 87. The hole for receiving the shank of the seed cell severing knife is eccentric to the axis of the inner shaft 87 by an amount equal to the eccentricity of the axis of the inner shaft 87 at its lower end relatively to the axis of the tubular shaft 74. The upper end of the shank of the seed cell severing knife has a flat face ground thereon, and is held in position by a locating pin 94 and set screw 95 (Fig. 3).

The blade portion 97 of the seed cell severing knife 92 is bent to extend laterally in a direction opposite to the eccentricity of its mounting in the inner shaft 87, and is curved downwardly to conform to the shape of the seed cell which it is desired to sever from the flesh of the fruit.

A drive pinion 98 is keyed concentrically onto the upper end of each inner shaft 87, and is secured in position thereon by a nut 99 screwed onto the threaded, reduced, upper end portion of the inner shaft 87. The pinions 98 are in toothed driven engagement with the uppermost double segmental gears 38, while the toothed, or pinion, upper portion 73 of the calyx knife shafts are similarly engaged by the toothed portions of the lower double segmental gear 37.

When the gear actuating links 54 and 55 are thrust axially outwardly from their normal positions of Fig. 1 by the rotation of the actuating cams 63 and 64 the segmental gears 37 and 38 will be swung in opposite directions, thereby rotating the respective shafts with which they are in toothed engagement in opposite directions. On their return movement the gears 37 and 38 and their respective knife shafts will be moved rotatively in the opposite directions, and thus will be returned to their normal positions. As mentioned previously herein, the thrust of the links 54 and 55 by their operating cams 63 and 64, and the ratio of the pinions and gear segments to each other, are such as to cause a complete 360° rotation of each of the knife shafts 74 and 87 and their supported knives, plus a complete 360° return thereof, upon each cycle of operation.

The upper self-aligning ball bearing 76 is concentric with the tubular shaft 74 in which it is mounted, while the lower self-aligning ball bearing 83 is eccentric thereto. Therefore, when the two shafts 74 and 87 are rotated in opposite directions the axis 87a of the inner seed cell knife shaft will describe a conical path about the concentric axis of rotation 74a of the tubular calyx knife shaft 74. The apex of this cone will be approximately at the center of the upper self-aligning bearing 76, where, as was mentioned previously herein, the axes of the two shafts intersect.

The divergence between the two shafts when thus mounted and rotated in opposite directions causes a slight wobble of the upper pinions 98. However, since the pinions 98 are so close to the point of incidence of the two shafts, and since the eccentricity of the pinion and the wobble caused by the divergence of the shaft axes is slight, the operation of the upper pinions by their associated segmental gears is not noticeably adversely affected. It is essential, of course, that sufficient clearance be provided to permit the pinions to rotate without binding on the gear segments.

The shank 93 of the seed cell severing knife being offset from the axis of its own inner shaft 87 by the same amount and, in the normal positions of the shafts, in the same direction, as the eccentricity of the axis of the inner shaft 87 at its lower end from the axis of the tubular shaft 74; when the two shafts 74 and 87 are rotated in opposite directions from their normal positions shown in Figs. 3 and 10, the shank 93 of the seed cell severing knife will move substantially in a straight line across the axis of the tubular calyx knife shaft 74, as shown diagrammatically in Figs. 10, 11 and 12. In these diagrammatic views the various parts are designated by the same numerals as employed elsewhere herein. Fig. 10 illustrates the knife supporting shafts 74 and 87 and their respectively supported knives 88 and 92 in their normal positions. Fig. 11 shows the relative positions of the parts after the shafts 74 and 87 have each been rotated through one quarter revolution in opposite directions, while Fig. 12 shows the relative positions of the parts after the shafts have each been rotated through one half revolution in opposite directions. The paths of the various parts during such rotation are indicated in dotted lines. The dotted line 97a indicates the elliptical path followed by the outermost point of the curved seed cell severing blade portion 97. Since the halves of the pear are separated by the thickness of the blades 21 and 22 this elliptical swing of the seed cell severing blade is designed to sever a substantially semi-spherical portion containing the seed cell from each half of a pear impaled on the splitting blade. Seed cell or core severing knives having different offsets and curvature may be provided for use in processing various types and sizes of fruit. The calyx knife 88, rotating concentrically around the axis of its tubular shaft 74, describes a truncated conical path to trim the peeling from the calyx depressions of the pears.

A splitting blade support bracket 100 (Figs. 3, 6, 7 and 8) is fitted onto the lower end of the tubular shaft housing 67, and is secured thereto by screws 101. The blade support bracket 100 has a blade mounting slot therein in which a pair of thick blade members 102 and 103 (Figs. 3 and 8) of a usual type are secured by screws 104. The two portions 102 and 103 of each splitting blade are spaced apart edgewise (Figs. 2 and 3) to provide a central gap for receiving the core of a fruit therein. The center of the gap between the blade portions is in vertical alignment with the axis of the calyx knife tubular shaft 74. The upper edge of each blade is sloped downwardly toward the gap in a usual manner to conform substantially to the depression in the calyx or blossom end of the pear when positioned on the blade as shown by the dotted line 35 in Fig. 3.

Each of the blade portions has a rounded notch 110 and 111 (Fig. 3) in the vertical edge thereof defining a side of the core receiving gap. These rounded notches surround the seed cell area of a fruit impaled on the blade. The vertical planes of the splitting blades 21 and 22 (Figs. 4 and 5) are disposed at an acute angle with respect to each other to provide clearance for the operation of the two sets of gripper arms 24. Otherwise adjacent gripper arms of the two sets would strike and interfere with each other when separated to their open or fruit receiving condition if the blades were separated laterally by the same distance as shown and were disposed along planes radially of the vertical axis of swing of the coring and splitting head A.

Each of the blade mounting brackets 100 has a rectangular frame portion 105 (Figs. 3, 6 and 8) formed on its inner side, onto which is secured, by cap screws 107, the outer ends of a pair of ejector slide casings 108 and 109 of rectangular box section. The inner ends of the ejector slide casings are inserted in complementary notches 112 and 113 (Figs. 2, 3 and 4) formed in the adjoining edges of a pair of side plates 114 and 115 for the lower housing 27. The ejector slide casings enter the lower housing (Fig. 4) at diverging angles conforming to the mounting angles of the splitting blades (Figs. 2, 4 and 5) since the vertical mid-plane of each ejector slide casing is coincident with the vertical mid-plane of the blade with which it is associated. A sealing gasket 117 (Figs. 3 and 4) is gripped between the cover notches 112 and 113 and the ejector slide casings 108 and 109. Each of the ejector slide casings is divided along a vertical median plane (Fig. 3) and the two halves thereof are secured together by screws 118.

Each ejector slide casing, when assembled as shown in Figs. 3, 4 and 8 has a rectangular axial opening therethrough in which the rectangular tubular stem 119 of an ejector 120 is mounted for endwise slidable movement. An ejector head 121 is mounted on the outer end of each ejector stem. Each ejector head comprises two similar but opposite head portions 121a and 121b (Figs. 3 and 4). These head portions are separated by a slot 122 (Fig. 3) of substantially the same thickness as the splitting blades 21 and 22 over which the ejector head is designed to be projected. This slot extends into the stem as shown in Figs. 3 and 5 for a distance sufficient to allow full projection of the ejector without interference from the spliting blade.

A pair of pear separating wedge portions 123 and 124 (Figs. 3, 4 and 5) are provided one on the lower end of each side of the ejector head, with their outer edges mounted to slide closely along the splitting blade to enter beneath the split halves of a pear thereon, and thereby to exert a wedge-like separating action on the pear halves to free them from the blade and to separate the pear halves laterally from the core.

Each side portion of the ejector head has a pear impacting portion 125 which curves upwardly from the wedge shaped lower portion 123 thereof, in a curve corresponding generally to the shape of the pear where it is engaged by this portion of the ejector. A rubber pad 127 may be mounted to overlie the curved ejector portion and conforms to the shape thereof. Thus, after the pears have been freed from the blade and have been separated laterally to clear the core by the wedge shaped lower portions 123 and 124, the pear halves will be engaged by the curved ejector portions 125 and ejected outwardly in the general direction of the plane of the blade.

The inner end of each ejector stem 119 extends inwardly beyond the ejector slide casings 108 and 109, and has a downwardly extending boss 128 formed thereon. The inner end portion of the bottom wall of each of the slide casings 108 and 109 is shortened as at 129 to avoid interfering with the boss 128 on actuation of the ejector. Ejector actuating pins 130 are secured one in each boss 128 by brazing.

A generally J shaped cam actuated lever arm 131 (Figs. 3, 4 and 5) has a pair of notches 132 and 133 in an outer marginal edge thereof to receive the ejector actuating pins 130 therein. The lever arm 131 is pivoted on a pin 134 mounted at one side of the lower housing 27. A pull link 135 is pivotally connected to an offset portion of the ejector actuating lever arm 131, and extends through a hole in the wall of the lower housing (Fig. 4). A coil spring 137 surrounds the outer portion of the pull link and is held in compression between a pair of washers 138 and 139, one of said washers resting against the wall of the housing, and the other being held in adjusted position on the pull link by a nut 140. The action of the spring on the pull link biases the actuating lever arm 131 in a counterclockwise direction, as viewed in Fig. 4.

A cam follower roller 141 is mounted on the under side of the lever arm 131, being journaled on a pin 142 secured in a hole in the lever arm to extend downwardly therefrom. A cam 143, keyed to the central drive shaft 28, engages the cam follower roller 141 and, by moving it against the bias of the spring 137, controls the operation of the ejector actuating lever 131 and the slidable movement of the ejectors. The cam 143 has a generally concentric high portion 144 which normally retains the ejector actuating lever in its clockwise limit of movement illustrated in Fig. 4, thereby holding the ejectors 120 in their retracted or normal condition. The cam 143 is designed to rotate in the direction of the arrow in Fig. 4, and when the roller 141 passes down the declivity 145 on the peripheral cam face of the cam onto the low portion 147 thereof (Fig. 5) the coil compression spring 137, through the pull link 135, swings the lever arm 131 to its actuated position. This actuation of the lever arm forces the ejectors 120 axially outwardly to free the pear halves laterally from the blade and core and then to eject them in the manner described previously herein. The cam 143 is secured to the vertical drive shaft 28 by a sleeve 148, mounted on the central vertical drive shaft 28 and secured thereto by a key 149. The cam 143 is secured to the lower end of the sleeve by cap screws 150.

A generally similar cam 151 for operating a pair of core anchoring spikes 152 (Figs. 3 and 5) is mounted in a similar manner on the upper end of the sleeve 148. This upper cam controls the operation of a spike actuating lever arm 153 (Figs. 3 and 5) which is generally similar to the ejector actuation lever arm 131 and is pivoted on the same mounting pin 134. The lever arm 153 is biased toward an actuated position by a pull link and compression spring, not shown, similar to those associated with the lever 151. A cam follower roller 163 (Fig. 5) controls the movement of the arm 153 against the biasing action of its associated compression spring in the same manner as described previously herein for the cam follower roller 141.

This second cam actuated lever 153 has a pair of notches 154 and 155 therein, each of which is adapted to receive an actuating pin 157 (Figs. 3, 4 and 5) mounted to extend upwardly from the rectangular inner end portion 158 of each core anchoring spike, one of which is mounted for endwise slidable movement in each ejector stem 119.

The rectangular inner end portion 158 has a tubular body portion 159 brazed thereto, and a spike retaining chuck 160, in the nature of an ordinary pin chuck, is provided on the outer end of the tubular body portion 159. The chuck 160 is adapted to have chucking engagement with a core retaining pin or spike 161 which extends axially outwardly therefrom, and is inserted for free slidable movement in a hole 162 (Figs. 3, 4 and 5) drilled transversely of each inner splitting blade member 102 at the seed cell notch therein. In its retracted position shown in Figs. 3 and 4, the spikes 152 are withdrawn clear of the seed cell notches in the inner blade members to permit a pear to be impaled on the splitting blade, and the seed cell severing knife blade 97 to swing through its elliptical rotative cycle without interference from the spike. In its actuated position, however, as shown in Figs. 2 and 5, the spike is projected to extend transversely into the central space bounded by the rounded notches in the blade members so as to penetrate the severed seed cell and thereby to retain the core in position while the pear halves are being ejected.

It will be noted in Fig. 1 that in the normal position of the upper segmental gear actuating cam 63, the declivity therein lies closely adjacent to the upper cam follower roller 61, so that the lever 59, and thereby the segmental gears 37 and 38 will be actuated to rotate the knife shafts 74 and 87 through their first or severing phase almost immediately after the drive shaft 28 starts its rotative cycle. In Fig. 4, however, which shows the ejector actuating cam in its normal position, it will be noted that the cam follower roller 141 on the ejector actuating lever arm 131 is located some distance from the declivity in its actuating cam 143. Since the declivity in the spike actuating cam 151 is immediately ahead of the declivity 145 in the ejector actuating cam, the seed cell severing knife will have completed its severing swing before the spike 152 is advanced to penetrate the seed cell and anchor the core.

The arrangement of the cams to position the declivity in the spike actuating cam 151 in advance of the declivity 145 in the ejector actuating cam 143 also insures that the cores will be pinned in place during the actuation of the ejectors.

*Operation*

The continuous rotation of the stemming tube turret, not shown, of the machine on which the illustrated splitting and coring head is mounted, carries the stemming tubes upright, in single file, beneath the splitting blades 21 and 22. As the stemming tubes thus pass in continuous procession beneath the splitting blades, the entire splitting and coring head A of the present invention is driven in a usual manner, to oscillate back and forth in timed relation to the rotation of the stemming tube turret. This oscillation is timed by a usual driving connection between the stemming tube turret and the coring and splitting head, so that the splitting blades 21 and 22 are moved through a portion of each oscillation in transferring register with each succeeding pair of correspondingly spaced stemming tubes. These successive movements in transferring register of the splitting blades with each succeeding pair of stemming tubes occurs at the terminal end of the cycle of movement of the stemming tubes about their common rotative orbit, at which time each stemming tube will have a peeled pear impaled axially thereon, the pear having been peeled during its progress around the machine.

While the splitting blades 21 and 22 are moving in transferring register with each succeeding pair of peeled pears impaled stem end down on the stemming tubes, the gripper arms 24, in open or separated condition, are moved downwardly over the pears. The gripper arms 24 and their operating mechanism, are of the same type as those illustrated and described in Thompson Patent 2,139,704, and are of a type well known to those familiar with the art.

After the grippers have been moved down over the pears to a proper position for gripping the pears, the gripper mechanisms are actuated in a usual manner to cause the arms to grip the pears. The two sets of gripper arms, each with a pear gripped therein, then are moved upwardly by the usual timed actuating mechanism to impale and split the pears in half on the splitting blades. The grippers retain the pear halves on opposite sides of the splitting blades during the coring and calyx trimming operations. The butt stop members 26 limit the height to which the pear halves can be drawn upwardly on the splitting blades by the gripper arms, and thus insure that the pears will be accurately positioned on the blades, approximately in the position indicated by the pear indicated by the dotted lines 35 in Fig. 3, with the seed cells of the pears within an area bounded by the pair of rounded notches 110 and 111 in the vertical spaced edges of the two blade portions 102 and 103 of each splitting blade.

The transfer of the pears from the stemming tubes to impaled split condition on the splitting blades occurs while the coring and splitting head is swinging in congruent relation to the stemming tube at which time the pinion 29 on the lower end of the vertical drive shaft is not rotating. The coring, splitting, spiking and ejecting operations are performed on the return swing of the coring and splitting head, which causes the driven pinion 29 (Figs. 1 and 3) and its connected vertical drive shaft 28, and the cams keyed thereto, to be rotated through one complete revolution.

While gripped in adjusted position on the splitting blades the calyx trimming knives 88 and seed cell severing knives 92 associated with each splitting blade are first rotated through one complete revolution each, in opposite directions, along the paths indicated in Figs. 10, 11 and 12, to peel the calyx or blossom depression in the upper end of the pear and to move the seed cell severing knife around its elliptical path to sever the seed cell from the flesh of the pear.

After the knives have thus been rotated, the core retaining spike 152 is projected endwise into the seed cell of each pear to retain the core in the gap between the blade portions during ejection of the completely prepared pear halves.

With the core thus spiked in position the ejectors 120 are actuated, the wedge shaped portions 123 and 124 of each ejector first freeing the pear halves from the splitting blades and separating them laterally to clear the core, and the curved, conforming, upper portions 125 of each ejector head then striking the pear halves to eject them outwardly clear of the machine.

After the ejection stroke of the ejectors the spikes and ejectors are retracted to their normal positions, and the knives 88 and 92 are reversely rotated to their normal position to throw the core out of the central gap in each splitting blade. This completes the operative cycle of the coring and splitting head, whereupon it again swings forward on its next cycle in congruent relation to the stemming tube turret, where a fresh pair of peeled pears are impaled on the splitting blades.

While we have described a preferred embodiment of the present invention, it will be understood, however, that various changes and modifications may be made in the details thereof without departing from the spirit of the invention and the scope of the appended claims.

Having thus described our invention, what we desire to protect by Letters Patent is as follows:

1. A splitting and coring head for a fruit preparation machine comprising a splitting blade having a central core receiving gap therein, means for impaling a fruit on said blade to halve the flesh of the fruit and to position the stem-blossom axis of the fruit centrally along said gap, releasable means for retaining the fruit halves positioned on said blade, a curved seed cell severing knife mounted adjacent the blade and along a side of the core receiving gap therein, means for moving the seed cell severing knife in an elliptical path with the longitudinal axis of the ellipse at right angles to the plane of the splitting blade, a core anchoring spike mounted for lengthwise movement in a hole through the splitting blade, means for advancing the spike into core penetrating condition, a pair of ejector head portions mounted on opposite sides of said blade and closely adjacent thereto, each of said head portions having a wedge shaped leading edge portion and a fruit impacting portion, means for advancing the ejector head portions across said blade into a fruit supporting portion thereof, and timed drive means mounted to operate said fruit impaling means, said seed cell severing knife, said spike and said ejector portions in predetermined timed sequence.

2. A splitting and coring head for a fruit preparation machine comprising a splitting blade having a central core receiving gap therein, means for impaling a fruit on said blade to halve the flesh of the fruit along a longitudinal mid-plane thereof and to position the stem-blossom axis of the fruit centrally along said gap, releasable means for retaining the fruit halves positioned on said blade, a core severing knife mounted to sever the core from the flesh of said fruit, a core penetrating member mounted for movement substantially parallel to the plane of the blade, means for advancing the penetrating member into core penetrating condition, a pair of ejector head portions mounted on opposite sides of said blade and closely adjacent thereto, each of said head portions having a wedge shaped leading edge portion and a fruit impacting portion, and means for advancing the ejector head portions across said blade into a fruit supporting portion thereof.

3. In a fruit preparation machine, a splitting blade having a central core receiving gap therein, means for impaling a fruit on said blade with its stem-blossom axis disposed lengthwise in said gap, a pair of rotatable knives mounted with their axes of rotation divergent from a point of intersection beyond a fruit impaling portion of said blade, means for rotating both of said knives about their own axes, means for swinging the axially divergent portion of one of said knives about the rotative axis of the other, said latter axis being substantially coincident with the center line of said blade gap, an edged portion of each knife being disposed within the blade gap and eccentric to its own axis of rotation.

4. In a fruit preparation machine, a splitting blade having a central core receiving gap therein, means for impaling a fruit on said blade with its stem-blossom axis disposed lengthwise in said gap, a pair of rotatable knives mounted with their axes of rotation slightly separated within said gap, means for rotating said knives about their own axes, means for swinging one of said knives to move its rotative axis about the rotative axis of the other during a rotative movement of said knives about their own axes, an edged portion of the blade on said one knife being disposed within the blade gap and eccentric to its own axis of rotation.

5. In a fruit preparation machine, a splitting blade comprising a pair of blade portions spaced apart edgewise to provide a core receiving gap therebetween, means for impaling a fruit on said blade to halve the flesh of the fruit and to position the fruit with its stem-blossom axis endwise in said gap, a pair of knife supporting rotatable shafts mounted endwise beyond said blade gap, one of said shafts having its axis of rotation substantially coincident with the longitudinal center line of said gap, the axes of said shafts being divergent from a point of intersection exteriorly of said blade, said one shaft being tubular, a toothed pinion on the end of said tubular shaft remote from said blade, a self-aligning bearing mounted concentrically in the remote end of said tubular shaft, a second self-aligning bearing mounted eccentrically in said tubular shaft between the first self-aligning bearing and the blade, the other of said shafts being journaled in said self-aligning bearings and extending axially endwise beyond said tubular shaft from said blade, a pinion mounted on said second shaft close to the point of intersection of the shaft axes, a trimming knife mounted eccentrically on the tubular shaft to extend into trimming engagement with a fruit halved on said blade, a seed cell severing knife mounted eccentrically on said other shaft, and normally extending along a blade edge portion defining a side of the blade gap to be positioned laterally adjacent a seed cell area of a fruit impaled on said blade, gear means operatively engaging the pinions on the tubular shaft and on the other shaft, and means for operating said gear means to rotate said shafts through one complete revolution in opposite directions to trim the calyx end of a fruit impaled on said blade and to sever the seed cell from the flesh of said fruit.

6. In a fruit preparation machine, a splitting blade having a core receiving gap therein, means for impaling a fruit on said blade to halve the flesh of the fruit and to position the fruit with its stem-blossom axis endwise in said gap, a pair of knife supporting rotatable shafts mounted endwise beyond said blade gap, one of said shafts having its axis of rotation substantially coincident with the longitudinal center line of said gap, the axes of said shafts being divergent along a mid-plane of the blade from a point of intersection exteriorly of said blade, said one shaft being tubular, the other of said shafts being journaled in self-aligning bearings within said tubular shaft, a trimming knife mounted on the tubular shaft to extend into trimming engagement with a fruit halved on said blade, a seed cell severing knife mounted on said other shaft, and normally extending along a blade edge portion defining a side of the blade gap, and means for rotating said shafts about their own axes to swing the other of said shafts about a conical path relatively to the axis of said one shaft, thereby to trim the calyx end of a fruit impaled on said blade and to sever the seed cell from the flesh of said fruit.

7. In a fruit preparation machine, a splitting blade having a core receiving gap therein, means for impaling a fruit on said blade to halve the flesh of the fruit and to position the stem-blossom axis thereof endwise in said gap, a pair of knife supporting axially rotatable shafts mounted endwise beyond said blade gap, a knife mounted eccentrically on each shaft and extending endwise therefrom for rotative core encircling movement in said gap, one of said shafts having its axis of rotation substantially coincident with the longitudinal center line of said gap, the other of said shafts having its lower end eccentric to the axis of said first shaft and bodily movable around the axis of said first shaft, means normally holding the shafts with their rotative axes substantially coincident with the mid-plane of the blade and with the knife mounting of said other shaft eccentric to the axis of its own shaft in a direction oppositely to the eccentricity of the lower end of said other shaft from the rotative axis of said one shaft, and means for rotating said shafts and their supported knives through one complete revolution while swinging the lower end of said other shaft bodily about the axis of said one shaft.

8. In a coring and splitting head for a fruit preparation machine, a pair of laterally separated shaft housings, a tubular shaft mounted for rotation in each of said housings, said tubular shafts being axially parallel, an inner shaft inserted lengthwise in each of said tubular shafts, one end of each inner shaft being journaled substantially concentrically of the tubular shaft, the other end of each inner shaft being journaled eccentrically of said tubular shaft whereby the axis of the inner shaft is swung in a conical path about the axis of the tubular shaft upon rotation of said tubular shaft, a pinion on each of said tubular and inner shafts, the pinion on each inner shaft being axially adjacent the concentric end journal support thereof, first gear means pivoted for toothed engagement with the pinions on said tubular shafts, second gear means pivoted for toothed engagement with the pinions on said inner shafts, means for moving said first and second gear means, rotatively to move each of said tubular shafts and said inner shafts through one complete revolution, and a knife mounted on said other end of each of said shafts to circumscribe a core element of a fruit held with its stem-blossom axis substantially coincident with the axis of each tubular shaft.

9. In a fruit preparation machine, a splitting blade adapted to halve a fruit, said blade having a core receiving gap therein, means for retaining the halves of a split fruit on opposite sides of said splitting blade, means for severing the core from a fruit thus halved and retained, a spike mounted in a hole through the blade, said spike being directed toward the core gap and normally clear of the core gap and core severing means, means for projecting the spike endwise into the core gap to penetrate a core therein and retain the core against displacement, means for releasing the fruit retaining means, and means for ejecting fruit halves away from the blade and the spike-retained core.

10. In a fruit preparation machine, a splitting blade adapted to halve a fruit, said blade having a core receiving gap therein, means for retaining the halves of a split fruit on opposite sides of said splitting blade, means for severing the core from a fruit thus halved and retained, a spike directed toward the core and normally clear of the core gap core severing means, and means for projecting the spike into the core gap along a path between the severed surfaces of the fruit halves to penetrate the core and retain it against displacement, and means for ejecting the fruit halves away from the blade and from the spike penetrated core.

11. In a fruit preparation machine, a splitting blade adapted to halve a fruit, said blade having a core receiving gap therein, means for retaining the halves of a split fruit on opposite sides of said splitting blade, means for severing the core from a fruit thus halved and retained, a core retaining means directed toward the core gap and normally clear of the core gap and core severing means, timed drive means mounted to operate the core severing means and then to advance the core retaining means along a path between the severed surfaces of the fruit halves into core retaining position in the core gap, and means for ejecting the fruit halves away from the splitting blade and from the retained core.

12. In a fruit preparation machine, a splitting blade adapted to impale and halve a fruit, said blade having a core receiving gap therein, said blade having a hole therein directed toward a core receiving portion of said gap, means for gripping the halves of a fruit impaled on said blade with its core in said gap to retain the fruit halves on said blade, rotatable core severing means operatively associated with said blade, a core retaining spike adapted to be projected lengthwise in said blade hole, means normally retaining the spike retracted in said hole clear of the core receiving gap, and means for projecting the spike endwise into the gap and into the core of a fruit impaled on said blade.

13. In a fruit preparation machine, a splitting blade adapted to impale and halve a fruit, said blade having a core receiving gap therein, said blade having a hole therein directed toward a core receiving portion of said gap, means for gripping the halves of a fruit impaled on said blade with its core in said gap to retain the fruit halves on said blade, rotatable core severing means operatively associated with said blade, a core retaining spike adapted to be projected lengthwise in said blade hole, means normally retaining the spike retracted in said hole clear of the core receiving gap, means for projecting the spike endwise into the gap and into the core of a fruit impaled on said blade to retain the core upon release of the gripping means to free the fruit halves, said spike projecting means comprising an intermittently actuated shaft operating in timed relation to the gripping means, a cam mounted to rotate with said shaft, a lever arm mounted adjacent said cam, a cam follower carried by said lever arm and operatively engaging said cam, and means operatively connecting said spike to said lever arm.

14. In a fruit preparation machine, a fruit supporting member having a gap therein lengthwise of a fruit supporting surface of said member, means for supporting a fruit half on said member with its stem-blossom axis in said gap, rotatable severing means operatively mounted adjacent a core area of a fruit thus supported on said member, means for rotating said severing means to sever a core thus positioned, a core retaining spike mounted normally clear of said gap, and means for projecting the spike endwise into the gap along a path between the severed surfaces of the fruit halves and into the core of a fruit supported on said member to anchor the core in the gap, and means for removing the fruit half from the severed, retained core.

15. In a fruit preparation machine, means for severing the flesh of a fruit by cuts on opposite sides of a core thereof and substantially along a common mid-plane of the fruit, means for severing the core from the flesh of said fruit, core penetrating means mounted normally clear of a fruit core, means for advancing said core penetrating means through one of the severing cuts in said flesh to penetrate said core, means for separating the severed halves of the flesh from said penetrated core, and means for withdrawing the core penetrating means from said core.

16. In a fruit preparation machine, a splitting blade, means for impaling a fruit on said splitting blade to halve the fruit, means for retaining the halves of said fruit on opposite sides of the splitting blade, means for releasing the retaining means to free the fruit halves, an ejector having a divided head portion with divisions of said head portion disposed closely adjacent the opposite sides of said blade, each division of said head having a wedge shaped portion directed toward a fruit supporting area of said blade, a fruit impacting portion formed on each of said head divisions and shaped to conform substantially to a marginal portion of a fruit half when retained on said blade, and means for projecting the head portions closely along the blade into a fruit supporting area thereof to free fruit halves laterally from opposite sides of the blade, and to eject the freed fruit halves edgewise beyond the blade.

17. In a fruit preparation machine wherein a fruit half is adapted to be supported with a flat side thereof on a substantially flat surface of a supporting member, an ejector head, a wedge shaped portion on said head directed transversely of the fruit supporting surface, a fruit impacting portion on said head shaped to conform substantially to a marginal portion of a fruit half supported on said surface, and means for projecting the head closely along the supporting surface into a fruit supporting area thereof with the wedge shaped portion in advance of the fruit impacting portion to free a fruit half from said surface, and to eject the freed fruit half edgewise of said surface.

18. In a fruit preparation machine, an ejector head portion, a leading wedge shaped portion on said head portion, a fruit impacting portion on said head portion rearwardly of the wedge portion, and means for projecting the head portion closely along a generally planiform fruit supporting surface to insert the wedge portion beneath a fruit half on said surface to free a fruit half supported thereon, and to engage the fruit by said impacting portion to eject the freed fruit half substantially along the plane of the surface.

19. In a fruit preparation machine, a splitting blade having an elongated core receiving gap therein, means for impaling a fruit on said blade to halve the flesh of the fruit and to insert the core in said gap with the stem-blossom axis of the fruit centered lengthwise in said gap, releasable gripping means adapted to retain fruit halves on opposite sides of said splitting blade, a bracket mounted at a side of the splitting blade, an ejector slide casing mounted on said bracket to extend laterally in the plane of the blade, an ejector slidably mounted in said casing and adapted to move transversely across the splitting blade, said ejector having a divided head, the divisions of said ejector head being positioned on opposite sides of said blade and closely adjacent thereto, a wedge shaped portion extending from each head division with a leading edge of each wedge closely adjacent the splitting blade to enter beneath the edge of a fruit half on the splitting blade to separate the fruit halves laterally from the splitting blade, and a fruit impacting head division portion having a curved fruit conforming face adapted to engage the separated fruit halves and eject them in the general direction of the plane of the blade.

20. In a fruit preparation machine, a member having a portion adapted to support a fruit half thereon, an ejector mounted to move across the fruit supporting portion of said member, said ejector having a wedge shaped portion with a leading edge thereof disposed adjacent the fruit supporting portion to enter beneath the edge of a fruit half on said fruit supporting portion to separate the fruit half supported thereon laterally away from the supporting portion, and a fruit engaging ejector portion having a face thereof adapted to engage the separated fruit half and eject it from said supporting portion.

21. In a fruit preparation machine, a splitting blade having a core receiving gap therein, means for impaling a fruit on said blade to halve the flesh of the fruit and to position the fruit with its stem-blossom axis endwise in said gap, a pair of rotatable knife supporting shafts mounted endwise beyond said blade gap, the axes of said shafts being divergent from a point of intersection exteriorly of said splitting blade and extending in slightly separated relation lengthwise of said gap, one of said shafts being journaled for rotation about its own axis, the other of said shafts being mounted with an end thereof eccentric to an end of said one shaft for bodily movement about the axis of said one shaft and for rotation about its own axis, a knife mounted eccentrically on said one shaft to extend into trimming engagement with a fruit impaled on said splitting blade, a seed cell severing knife mounted eccentrically on said other shaft and normally positioned laterally adjacent a seed cell area of fruit impaled on said splitting blade, a pinion on each of said shafts, gear means operatively engaging the pinions on each of said shafts, and means for operating said gear means to rotate each of said shafts through one complete revolution about its own axis while eccentrically moving the eccentric end of said other shaft about the axis of said one shaft, thereby to trim the calyx end of a fruit impaled on said splitting blade and to sever the seed cell from the flesh of said fruit.

22. In a splitting and coring head for a fruit preparation machine, a splitting blade having a central core receiving gap therein, means for impaling a fruit on said splitting blade to halve the flesh of the fruit and to position the core of the fruit lengthwise within said gap, the halves of the fruit flesh being separated by the thickness of the splitting blade, a rotatable knife supporting shaft mounted to extend endwise beyond said gap, means for rotating said knife supporting shaft about its own axis, means for swinging said knife suporting shaft to move its axis in an eccentric path about another axis extending lengthwise of said gap along the mid-plane of the splitting blade, the eccentricity of the shaft axis from said other axis at a predetermined point being approximately one-half the thickness of the splitting blade, means for normally positioning the knife supporting shaft axis along the mid-plane of the splitting blade, a seed cell severing blade shank mounted on said knife supporting shaft and eccentric thereto at a predetermined point by approximately one-half the thickness of the splitting blade, the center of said shank being normally positioned along the mid-plane of the splitting blade, a sharpened seed cell severing blade mounted on said shank and extending across the shaft axis and a predetermined distance therebeyond, normally to lie within the splitting blade gap, and means for simultaneously rotating and eccentrically swinging said knife supporting shaft to move said shank back and forth along a predetermined path thereby to swing said eccentric, sharpened, seed cell severing blade about an elliptical path, the major axis of said elliptical path being normal to the mid-plane of the splitting blade and being longer than the minor elliptical path axis by approximately the thickness of the splitting blade.

WILLIAM DE BACK.
SYLVIO PUCCINELLI.
ROBERT A. McCLOUD.

REFERENCES CITED

The following references are of record in the file of this patent:

UNITED STATES PATENTS

| Number | Name | Date |
| --- | --- | --- |
| 794,598 | Dunkley | July 11, 1905 |
| 1,476,937 | Walden | Dec. 11, 1923 |
| 1,785,017 | Thompson | Dec. 16, 1930 |
| 1,861,084 | Goranson et al. | May 31, 1934 |
| 2,139,704 | Thompson et al. | Dec. 13, 1938 |
| 2,158,545 | Kieweg | May 16, 1939 |
| 2,343,098 | Thompson | Feb. 29, 1944 |
| 2,429,749 | Dunn | Oct. 28, 1947 |